INVENTORS
ISTVAN HALASZ
HANS-OTTO GERLACH
BY
ATTORNEY

United States Patent Office 3,513,637
Patented May 26, 1970

3,513,637
HIGH POROSITY COLUMN FOR GAS CHROMATOGRAPHY
Istvan Halasz, Frankfurt am Main, and Hans-Otto Gerlach, Oberursel, Germany, assignors, by mesne assignments, to Varian Associates, Palo Alto, Calif., a corporation of California
Filed Oct. 11, 1966, Ser. No. 585,906
Claims priority, application Germany, Apr. 15, 1966, 1,544,162
Int. Cl. B01d 15/08
U.S. Cl. 55—197        7 Claims

ABSTRACT OF THE DISCLOSURE

A chromatographic column defining a path for the gas stream between the point of introduction of the sample mixture and the detector wherein the tube is filled with a packing material that has an interparticle porosity greater than 0.80 and consists of primary spherical particles approximately 20 to 500 angstroms in diameter linked together in branched chains forming an irregular three dimensional network.

---

Figure 1:
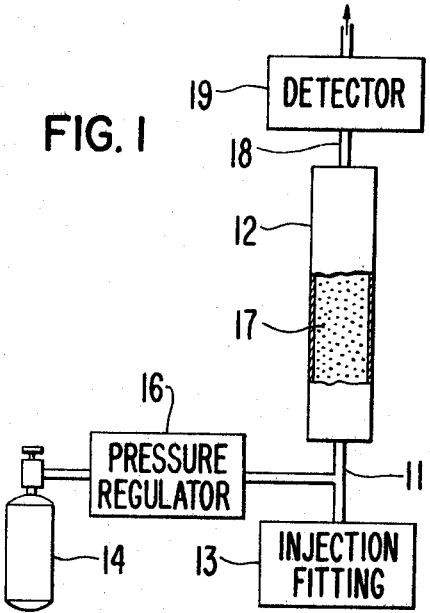

This invention relates to gas chromatography and, in particular, to a gas chromatographic column wherein the packing material is highly dispersed throughout the column volume.

The performance of a gas chromatographic column may be analyzed mathematically by considering the column length as being divided into a large number of discrete zones. In each of these zones it is assumed that the sample vapor reaches distribution equilibrium between the carrier gas and the stationary phase. Each of these idealized zones is called a "theoretical plate," a term originally used in a similar mathematical analysis of plate-type distillation columns. This method of theoretically analyzing column performance is called the "plate theory" of gas chromatography. In an actual column, however, the sample vapor never attains distribution equilibrium between the carrier gas and the stationary phase. This is because the carrier gas is continuously moving relative to the stationary phase, and the sample vapor does not contact a fixed volume of stationary phase for a time sufficient to establish distribution equilibrium. Thus, in practice, the theoretical assumptions of the "plate theory" are not realized. However, in order to reconcile theory and practice, it is convenient to define a characteristic length of column which gives a separation of sample components equivalent to the separation which would be given by a single theoretical plate. This characteristic length is called the "Height Equivalent to a Theoretical Plate," symbolized as H. If H is the length of column equivalent to a single theoretical plate, then $1/H$ represents the number of equivalent theoretical plates per unit length of column. Thus, for example, if H is expressed in centimeters, $1/H$ represents the number of equivalent theoretical plates per centimeter of column.

The "separating efficiency" of a column may be defined as $1/H$, that is, the number of equivalent theoretical plates per unit column length. "Efficiency" in this case refers to the total column length required to achieve a given separation. Thus, other conditions such as temperature and stationary phase being equal, a short length of a highly efficient column will accomplish the same separation as a longer length of a less efficient column. It follows from the foregoing definition that separating efficiency increases as H decreases. Therefore, one of the goals in designing a chromatographic column is to make H as small as possible.

Various experimental studies have shown that H is approximately proportional to the particle diameter, $d_p$, of the column packing. It might thus appear obvious that H could be made as small as desired simply by packing the column with particles of suitably small diameter. However, the column inlet pressure for a given average linear carrier gas velocity is inversely proportional to the square of particle diameter ($d_p^2$). Consequently, although it is theoretically possible to make H as small as desired by decreasing the particle size of the packing material, the rapid rise of column inlet pressure sets definite practical limits to the particle size, and hence a corresponding lower limit to the value of H. The smallest particles used in conventional packed chromatographic columns have diameters in the order of $10^{-2}$ centimeters. Using particles of this size, the best conventional packed columns achieve an H value of about 0.03 centimeter. This corresponds to a separating efficiency of 30 equivalent theoretical plates per centimeter of column length. It has long been recognized that one route to more efficient columns is the use of smaller particles for the packing material, but heretofore this course has been limited by the rapid rise of column flow resistance with decreasing particle size.

The present invention provides a new type of chromatographic column having a separating efficiency several times higher than conventional packed columns. This significant increase in efficiency is achieved by packing the column with extremely small particles and highly dispersing the packing material throughout the column volume. The highly dispersed packing permits the use of very small particles without significantly increasing the flow resistance of the column. Consequently, it is now possible to decrease column H values and still keep inlet pressures within ordinary limits. Because of the porous nature of the new column packings, and in the interest of brevity, the chromatographic columns provided by this invention will hereinafter be referred to as "aerogel" or "high porosity" columns. It is to be noted that the column still is a packed column in contrast to prior known chromatographic columns without packing, which columns are useful only in greater lengths.

It should be noted that the use of a highly dispersed packing in the aerogel columns is in direct contrast to conventional packed columns wherein every effort is made to pack the column as densely as possible. Preliminary experiments with aerogel columns have resulted in packings wherein the solid material occupies only 2 to 4% of the total column volume. This may be contrasted with a conventional packed column wherein the solid packing commonly occupies about 60% of the total column volume.

In addition to the increase in separating efficiency already mentioned, a further advantage of aerogel columns is that extremely rapid chromatographic separations can be made. For example, a mixture of methane, propane, and propylene was separated in only 2 seconds on an aerogel column. Of these 2 seconds, about 0.7 second was instrument "dead time," that is, time spent by the injected sample in traversing connecting tubing before reaching the aerogel column. Thus, the actual separating time was only 1.3 seconds for the three component mixture. In another separation, a seven component mixture of $C_1$ to $C_4$ hydrocarbons was well resolved in just 20 seconds on a 1.6 meter length of aerogel column. In still another example, a fourteen component mixture of $C_1$ to $C_6$ hydrocarbons was separated in 60 seconds.

Figure 2:
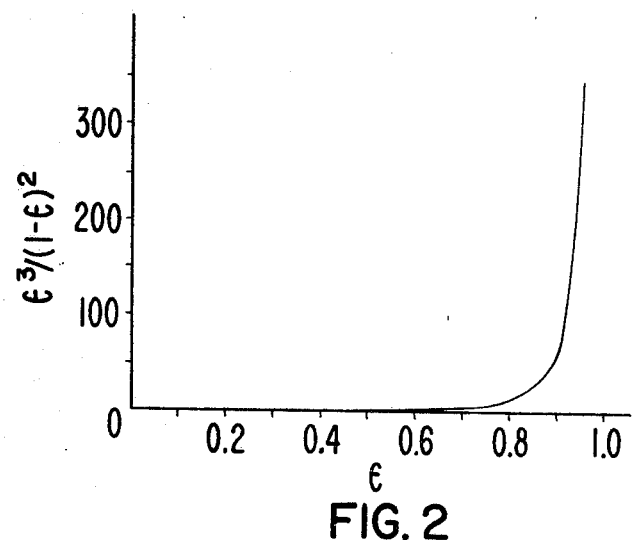
Figure 3:
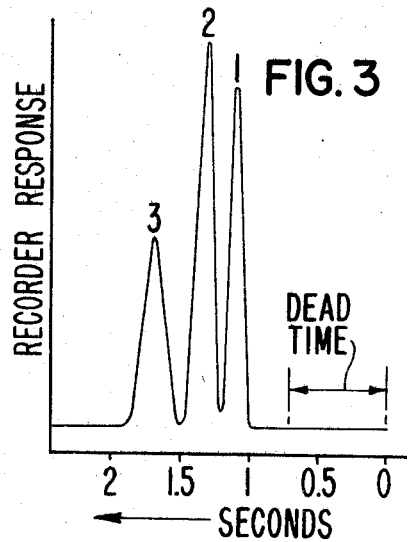
Figure 5:
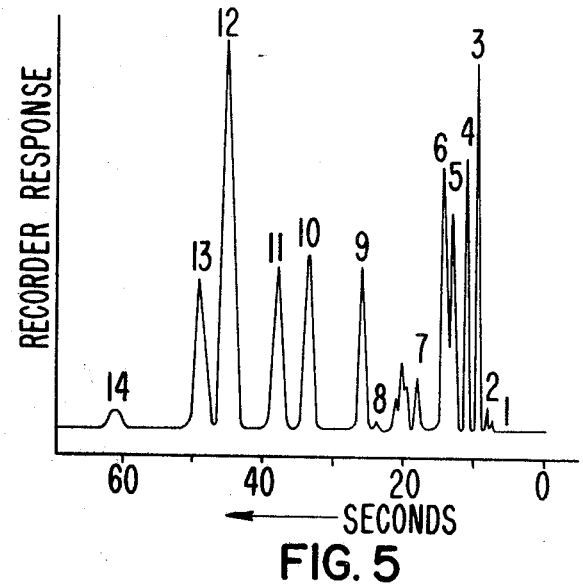
Figure 4:
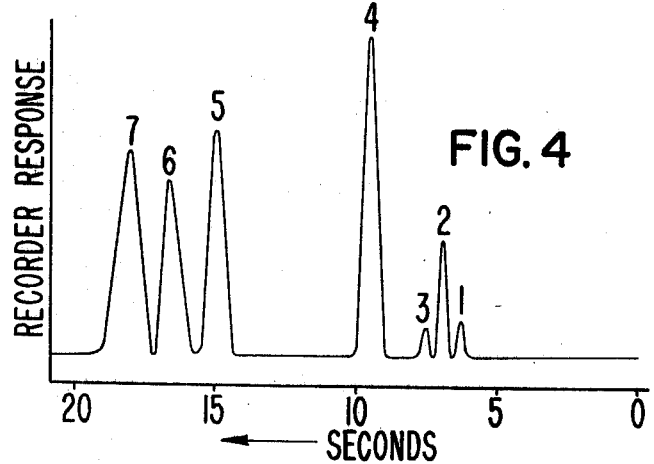

The invention will be described in greater detail with reference to the accompanying figures, of which;

FIG. 1 is a schematic representation of a gas chromatographic apparatus incorporating a high porosity packed column as provided by this invention, FIG. 2 is a graphical plot showing $\epsilon^3/(1-\epsilon)^2$ as a function of $\epsilon$ where $\epsilon$ is the interparticle porosity in a packed column, FIG. 3 shows the separation of a mixture of methane, propane, and propylene on a high porosity column, FIG. 4 shows the separation of a seven component mixture of $C_1$ to $C_4$ hydrocarbons on a high porosity column, and FIG. 5 shows the separation of a fourteen component mixture of $C_1$ to $C_6$ hydrocarbons on a high porosity column.

Referring to FIG. 1, there is shown a gas chromatographic apparatus which incorporates a high porosity packed column as provided by this invention. In operation, a sample mixture to be analyzed is injected into the inlet 11 of a chromatographic column 12 through an injection fitting 13. The injected sample is vaporized into a stream of carrier gas supplied by a compressed gas source 14 and a pressure regulator 16. The mixture of vaporized sample and carrier gas is swept through the high porosity column packing 17 wherein the various components in the sample mixture are partitioned between the stationary packing and the moving gas stream. The resulting separated components are swept through the column by the carrier gas and individually emerge at the column outlet 18 where they are consecutively detected by a detector 19 and then vented to the atmosphere (or collected if the detector is non-destructive in operation).

Injection fitting 13 may comprise an elastomeric septum through which the sample is injected by means of a hypodermic syringe. Other injection devices may be used, and these are well known in the gas chromatography field. Detector 19 may comprise any one of several conventional devices, e.g., flame ionization detector, thermal conductivity detector, etc. In particular, the flame ionization is especially suited for use with high porosity packed columns because of its high sensitivity and excellent linearity over a wide concentration range.

The flow resistance of a column is inversely proportional to the "gas permeability," K, which is defined for packed columns by the so called Kozeny-Carman equation:

$$K = \frac{d_p^2}{180} \cdot \frac{\epsilon^3}{(1-\epsilon)^2} \quad (1)$$

where:

K=gas permeability ($CM.^2$)
$d_p$=particle diameter of packing (cm.)
$\epsilon$=interparticle porosity (dimensionless)

The "interparticle porosity," $\epsilon$ is the fraction of column cross section available to moving gas, i.e., the total interparticle free space per unit column volume. Equation 1 shows that the permeability of a packed column depends on just two factors; the particle diameter ($d_p$) and the interparticle porosity ($\epsilon$). However, for randomly packed chromatographic columns, it has been experimentally and theoretically shown that $\epsilon$ is approximately constant and independent of particle size (see H. Purnell, "Gas Chromatography," page 62, John Wiley Inc., 1962). Experimental studies over a wide range of particle sizes give a constant value of $\epsilon=0.40$. Thus, in conventional packed columns (random packing is universally used in preparing such columns), $\epsilon$ is constant at 0.40 and consequently K is a function of $d_p^2$ only. This readily explains why column inlet pressure increases so rapidly with decreasing particle size in conventional packed columns. For example, decreasing the particle size by a factor of 10 will decrease the column permeability by a factor of approximately 100, and hence increase the column inlet pressure for a given average linear carrier gas velocity by a corresponding factor of approximately 100.

The crux of the present invention is the discovery that particle size may be significantly decreased without decreasing column permeability only if $\epsilon$ is made larger than a certain critical value. Referring to FIG. 2, there is shown a graphical plot of $\epsilon^3/(1-\epsilon)^2$ as a function of $\epsilon$. The quantity $\epsilon^3/(1-\epsilon)^2$ determines the dependence of column permeability on $\epsilon$ (see Equation 1 above). FIG. 2 shows a very slowly rising curve until $\epsilon$ reaches about 0.7, at which point the curve begins to rise very steeply, asymptotically approaching infinity at $\epsilon=1.0$. The curve thus indicates that small changes in $\epsilon$ have negligible influence on the value of $\epsilon^3/(1-\epsilon)^2$ until $\epsilon$ is larger than 0.7. At this point, small changes in $\epsilon$ begin to have an increasing effect on the value of $\epsilon^3/(1-\epsilon)^2$, reaching a maximum effect when $\epsilon$ is in the range 0.9 to 1.0. As mentioned previously, Equation 1 shows that column permeability is the product of two factors, $d_p^2$ and $\epsilon^3/(1-\epsilon)^2$. If $\epsilon$ is greater than 0.7 and, in particular, between 0.9 and 1.0, $d_p$ can be drastically reduced without significantly changing column permeability. For example, in conventional randomly packed columns, $\epsilon$ has a constant value of 0.4 (see previous discussion), and $d_p$ has a lower limit of about $10^{-2}$ centimeters. If these values are inserted into Equation 1, one obtained the following permeability:

$$K = \left[\frac{d_p^2}{180} \cdot \frac{\epsilon^3}{(1-\epsilon)^2}\right] = \left[\frac{(10^{-2})^2}{180} \cdot \frac{(0.4)^3}{(1-0.4)^2}\right] = 10^{-7} \text{ cm.}^2 \quad (2)$$

If the same calculation is repeated with $\epsilon=0.97$, $d_p$ can be decreased to $10^{-4}$ centimeters while still maintaining the same column permeability ($10^{-7}$ cm.$^2$). This calculation shows that particle diameter can be greatly decreased if $\epsilon$ is maintained in the steeply ascending portion of the curve in FIG. 2, i.e., greater than about 0.7.

The basic concept of the invention, i.e., the use of a highly dispersed column packing with $\epsilon$ greater than 0.7, may be embodied in various ways. For example, there are several naturally occurring minerals which crystallize in the form of indefinitely extended "chain lattices." This group of minerals includes polymetaphosphates ($-PO_3^-$), metal silicates ($-SiO_3^{--}$), and minerals of the "amphibole group" which contain the chain ion $(-Si_4O_{11}^{-6})_n$. Physically, these minerals occur as long fibrous crystalline needles. When such crystalline fibers are randomly packed into a chromatographic column, the very high length-to-diameter ratio of the fibers prevents close packing and results in a highly dispersed or porous packing. In addition to naturally occurring fibrous minerals, various synthetic materials are available in the form of extremely fine filaments suitable for preparing high porosity chromatographic columns. For example, filaments of fiberglass or nylon may be randomly packed in a column to form a very dispersed packing of high porosity. In this case, as with the minerals mentioned previously, the effective "particle diameter," $d_p$, is the diameter of the fiber or filament.

Another class of materials which may be used to prepare high porosity chromatographic columns are those substances which crystallize or form as loose, open three dimensional networks. Among this class of materials are certain natural and synthetic silicas. In particular, it was found that "Aerosil" (manufactured and trademarked by Degussa G.m.b.H., Frankfurt am Main, Germany), a loose flaky $SiO_2$ powder made by gas phase pyrolysis of $SiCl_4$, had excellent performance characteristics as a high porosity column packing, and the Aerosil packing was used in all the chromatographic separations described hereinafter. However, it should be noted that the following detailed description of this particular packing is in no way intended to limit the scope of the invention, and is intended solely to illustrate the basic concept of using high porosity chromatographic columns.

Aerosil consists (on the microscopic level) of irregular three dimensional networks which are built up from linear and branched chains of primary spherical particles approximately 20 to 500 A. in diameter. Because of the fragility of these networks, Aerosil could hardly be used as a column packing directly as received from the supplier. It was found that the mechanical strength of the network structures could be substantially increased by forming Aerosil gels with non-polar organic solvents, and then evaporating the solvent to recover the "strengthened" Aerosil. In particular, a quantity of Aerosil was moistened with carbon tetrachloride until a gelatinous mass was obtained. The carbon tetrachloride was carefully evaporated, and the dried material was ground in a mortar to break up large lumps which formed during the drying process. The resulting material was a fluffy voluminous powder containing numerous agglomerated particles. These agglomerates could not be removed by sieving because the particles became electrostatically charged and tended to clump together even more strongly. It was found that the lumps could be removed by placing the powder in a plastic bowl about 20 centimeters in diameter which was fixed in a vibrator inclined 30° to the vertical. When the bowl was vibrated, the various powder particles (actually three dimensional networks on the microscopic level) described smaller or larger semicircles depending on the mass of the individual particles. The lightest particles migrated to the rim of the bowl, at which point they passed through a hole in the rim and were collected for use. The steeper the bowl is tilted, the finer is the fraction obtained after a certain time; in view of the electrostatic charge the bowl may be tilted rather steeply without danger of spilling material. A thick walled glass tube (2.2 mm. I.D., 6 mm. O.D.) about one meter long was filled with the light fraction of the silica powder. The filled tube was then drawn out to a capillary of 0.4 mm. inner diameter. The appearance of the filling was that of a homogeneous, milky, and opaque mass with little sign of individual flakes or particles. The column contained about 7.5 milligrams of packing per meter of column length. Calculated from the true density (2.36 g./cc.), the packing occupied only 2.5% of the column volume ($\epsilon=0.975$). Because of the network structure of the packing, it was difficult to define a particle diameter. However, examination of the structure by electron microscope showed the "unit network" to be a cell of about one micron ($10^{-4}$ centimeter) in average dimension. Thus, the average "particle diameter" of the packing was about 100 times smaller than the smallest particles used in conventional packings ($10^{-2}$ centimeter).

A column prepared as described above was tested by using it to separate several hydrocarbon mixtures. The details of these tests are given in the following examples. In all cases, the chromatographic apparatus was similar to that described by Bruderreck, Schneider, and Halasz, Analytical Chemistry, 36, 461 (1964).

EXAMPLE I

Column length—0.2 meter
Column temperature—25° C.
Inlet pressure—5 atmospheres
Outlet pressure—1 atmosphere
Gas velocity—55 centimeters per second
Detector—flame ionization A $5\times10^{-8}$ gram sample of a methane, propane, propylene mixture was separated on an aerogel column operated under the above conditions. The chromatographic trace is shown in FIG. 3 where recorder response is plotted against time. Complete separation of the three components was obtained in two seconds. The numbers above the peaks identify the components as follows: (1)=methane; (2)=propane; (3)=propylene.

EXAMPLE II

Column length—1.6 meters
Column temperature—25° C.
Inlet pressure—6 atmospheres
Outlet pressure—1 atmosphere
Gas velocity—27 centimeters per second
Detector—flame ionization
Carrier gas—hydrogen A $1.5\times10^{-7}$ gram sample of a mixture of $C_1$ to $C_4$ hydrocarbons was separated on an aerogel column operated under the above conditions. The chromatographic trace is shown in FIG. 4 where recorder response is plotted against time. Complete separation of the seven components was obtained in 20 seconds. The numbers above the peaks identify the components as follows: (1)=methane; (2)=ethane; (3)=ethylene; (4)=propane; (5)=propylene; (6)=iso-butane; (7)=n-butane.

EXAMPLE III

Column length—1.6 meters
Column temperature—27° C.
Inlet pressure—5 atmospheres
Outlet pressure—1 atmosphere
Gas velocity—22 centimeters per second
Detector—flame ionization
Carrier gas—hydrogen moistened over $Na_2SO_4 \cdot 10H_2O$ (20° C.)

A $1.5\times10^{-7}$ gram sample of a mixture of $C_1$ to $C_6$ hydrocarbons was separated on an aerogel column operated under the above conditions. The chromatographic trace is shown in FIG. 5 where recorder response is plotted against time. Good separation of the mixture was obtained in 65 seconds. The numbers above the peaks identify the components as follows: (1)=methane; (2)=ethane; (3)=propane; (4)=propylene; (5)=isobutane; (6)=n-butane; (7)=butene-1; (8)=isopentane; (9)=n-pentane; (10)=n-pentene-1; (11)=3-methylbutene-1; (12)=2-methylbutene-1; (13)=2-methylbutene-2; (14)=n-hexane.

None of the Aerosil packings in Examples I to III were coated with liquid phase, i.e., the hydrocarbon mixtures were separated by gas solid chromatography rather than gas liquid chromatography. However, preliminary experiments with Aerosil packings coated with common liquid phases have given excellent results. Apparently, the high porosity of the network structure is unimpaired by the liquid coating on the particles. In addition, studies have been made using mixed packings of Aerosil and highly dispersed solids, e.g., ferric oxide and carbon black. It appears that, in some cases, the mixed packings are superior in separating ability to the pure Aerosil column.

As stated previously, the detailed description of the preparation and performance of high porosity columns using Aerosil has been given solely to illustrate the basic concept of highly dispersed packing with $\epsilon$ greater than 0.7, and is not intended to limit the scope of the invention in any way. Various naturally occurring minerals and synthetic materials have been named which will give results equal to or better than columns packed with Aerosil. Other variations and modifications will occur to those skilled in the chromatography field, and it is intended that this invention be limited solely by the scope of the following claims.

What is claimed is:

1. Apparatus for separating a sample mixture into its components, comprising in combination,
   (a) a source of carrier gas,
   (b) means connected to said source adapted to define a stream of the carrier gas,
   (c) means for introducing the sample mixture into a stream of the carrier gas,
   (d) means for detecting separated components of the sample mixture, and
   (e) a chromatographic column defining a path for the gas stream between the point of introduction of the sample mixture and the detector, said column comprising a tube which is filled with a particulate packing material that has an interparticle porosity greater than 0.80 and forming an irregular three dimensional network which is built up from linear and branched chains of primary spherical particles approximately 20 to 500 angstroms in diameter.

2. A chromatographic colunm comprising a tube which is filled with a particulate packing material that has an interparticle porosity greater than 0.80 and forming an irregular three dimensional network which is built up from linear and branched chains of primary spherical particles approximately 20 to 500 angstroms in diameter and inlet and outlet fittings affixed to the tube for passing a gas stream therethrough.

3. A column according to claim 2, wherein the packing is a mixture of solid particles having different chemcial compositions.

4. A column according to claim 2, wherein the particles of the packing are coated with a liquid phase.

5. A column according to claim 2, wherein the interparticle porosity is determined by the random packing of particles having a high length-to-diameter ratio.

6. A column according to claim 2, wherein the interparticle porosity is determined by the interstitial spaces in a random packing consisting of particles having an internal network structure.

7. A column according to claim 6, wherein the network structure comprises cross-linked chains of primary particles, said primary particles being silica spheres.

References Cited
UNITED STATES PATENTS

| | | | |
|---|---|---|---|
| 3,069,897 | 12/1962 | Sanford | 55—67 X |
| 3,237,380 | 3/1966 | Barrett | 55—67 |
| 3,283,483 | 11/1966 | Halasz et al. | 55—386 |

J. L. DE CESARE, Primary Examiner